Dec. 23, 1952     J. W. SCHUKRAFT     2,622,290

HOSE CLAMP

Filed June 12, 1950

INVENTOR

JOHN W. SCHUKRAFT

BY *Thomas W. J. Clark*

ATTORNEY

Patented Dec. 23, 1952

2,622,290

UNITED STATES PATENT OFFICE 2,622,290

HOSE CLAMP

John W. Schukraft, Towson, Md., assignor, by mesne assignments, to Randall Corporation, Arbutus, Md., a corporation of Maryland Application June 12, 1950, Serial No. 167,610

6 Claims. (Cl. 24—19)

The present invention relates to a clamping device and more particularly to a clamping unit of substantially universal application adapted to apply an embracing pressure to hose or the like of greatly varying diameter.

The present invention contemplates yet more specifically a hose clamp comprising a strap or other elongated gripping member in combination with a positively acting locking means for drawing the strap increasingly tight about the embraced member.

It is an object of the present invention to make a clamp construction of the foregoing type substantially distinct from the prior art frictional clamping means by providing in addition to the usual reverse bend in the variable length end of the strap, a step-shaped bend in the strap to positively lock the strap in the holding member. To this end, the invention provides a J-shaped body member having an upstanding flange about which one end of the strap is snubbed by a clamp member which is forced down against the strap to form the step therein between the flange and the clamping member. There is thus accomplished a locking hold which is substantially shake-proof as compared with the conventional frictional single bend clamping structure. With this invention it is possible to use more flexible straps because of the additional bend formed therein which positively prevents slippage of the strap.

Other advantages and objects of the present invention will be apparent from the following description and the accompanying drawings in which.

In the drawings the same numerals refer to the same parts throughout the several views.

Figure 2:
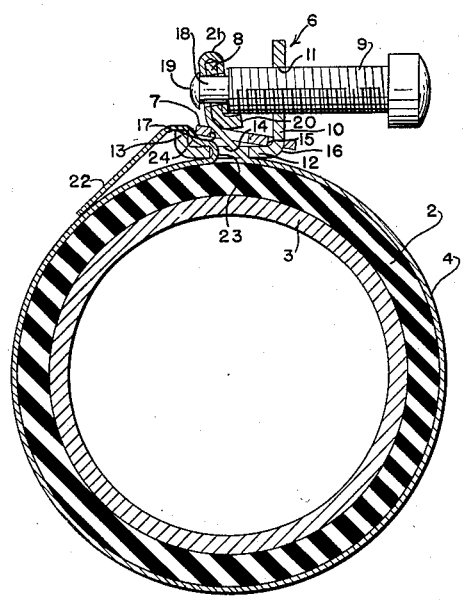
Figure 2 is a sectional view taken along the line 2—2 of Figure 1.
Figure 1:
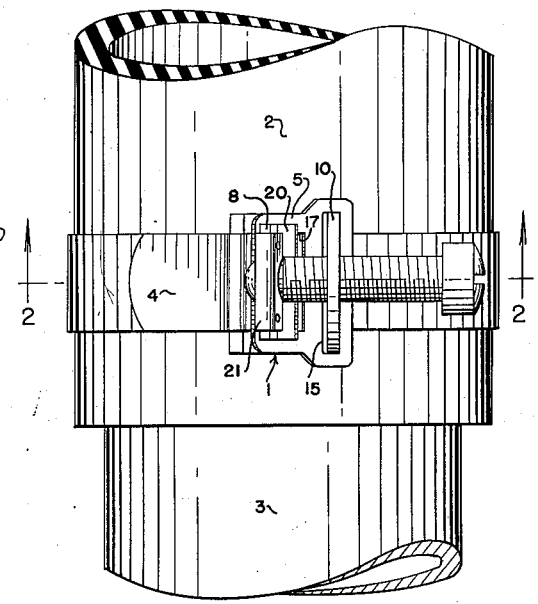
Figure 1 is a top plan view of the clamping device of the invention applied to a hose for clamping it to an internal tubular support.

In Figures 1 and 2 is shown a hose clamp 1 constructed in accordance with the principles of this invention attaching a hose 2 to a pipe 3. The hose clamp comprises a strap 4 and a locking unit 5. The strap 4 is preferably an elongated band of flexible, somewhat resilient material such as steel of uniform lateral width capable of being drawn forcefully about a hose.

The locking unit comprises a bracket 6 of J shape having a plate or clamp member 7 mounted loosely thereon for cooperation with a flanged plate or jaw 8 carried by tightening screw 9. The back member or long leg 10 of the bracket has a threaded opening 11 receiving the screw 9 and it extends upwardly at substantially right angles to the base 12 of the bracket at the rear end thereof. At the forward end of the bracket base 12 is an upstanding flange or projection 13, the short leg of the J, of height approximately equal to the combined thickness of strap 4 and clamp member 7 so that the flanged jaw 8 may ride over the flange 13 in tightening the clamp. The base 12 has a central rectangular slot 14 for receiving the ends of the strap.

Figure 3:
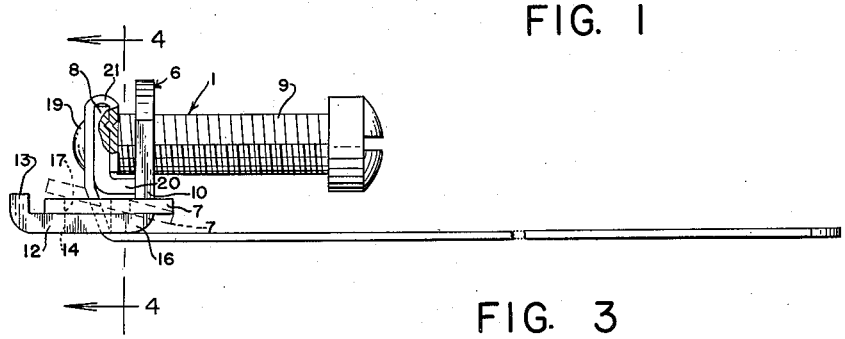
Figure 3 is a partially broken side elevational view prior to the application of the hose clamp.
Figure 4:
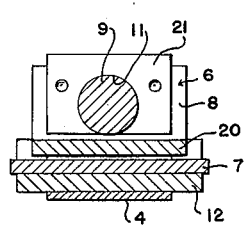
Figure 4 is a transverse sectional view taken along line 4—4 of Figure 3.

The clamp member 7 comprises a flat generally rectangular plate having a rear relatively narrow slot 15 slightly wider than the thickness of the back member 10 which it receives therethrough. The plate 7 thus rests on the rear end of the base 12 and can actually pivot or slide about the curved juncture 16 between the back member 10 and base portion 12 limited by the position of the jaw 8 as indicated in Figure 3 in dotted outline. A forward rectangular slot 17 of the clamp member 7 is substantially coextensive with the central slot 14 of the J-shaped bracket.

After the clamp member or plate is assembled on the bracket, the screw 9 is threaded through the opening 11 and the flanged plate or jaw 8 is fixed on the extension 18 of the screw by heading over the outer extremity of the extension as indicated at 19. The jaw 8 preferably has a backwardly extending flange 20 at its lower end of width somewhat greater than the width of the strap and slots 14 and 17, so that it must slide on top of clamp member or plate 7.

Prior to assembling the flanged plate or jaw 8 on the extension 18, one end 21 of the strap is fixed to the jaw 8, preferably by folding the strap end over the top edge of the jaw and down to the flange on the rear side of the jaw, forming a jaw, or squeezing or wedging member, the extension 18 thus extending twice through the strap end 21 to hold it securely thereon.

As seen in Figures 2 and 3, the strap extends downwardly through slots 14 and 17 and around hose 2 and then back through slot 14 and under clamp member 7, and over flange or shorter leg 13, the opposite free end 22 of the strap lying along the adjacent strap portion on the hose. Preferably for all size hose to be clamped there will be an end portion 22 extending through the clamp bracket base slot, by which the strap can be pulled tightly on the hose before the screw 9 is advanced. As the screw is now tightened the strap is still further pulled against the hose and the flanged plate or jaw 8 presses on the plate or clamp member 7 through the strap end 21 therearound to bend the strap adjacent end 22 reversely to the original bend 23 of the strap about the bracket base, as indicated by reference numeral 24. The bend 24 tends toward a step shape as the screw is advanced and the clamp plate is forced downwardly toward the juncture of flange 13 and the base portion 12. Thus a secure shakeproof locking of the strap is accomplished, which locking action is substantially independent of the flexibility or thickness of the strap as compared with the simple reverse bend which requires an excessively stiff band to prevent slipping.

As the screw is even further advanced beyond the position shown in Figure 2, the flange 20 rides across the plate or clamp member 7 and flange 13 and along the strap end 22, the portion of the strap adjacent end 21 serving to securely hold the clamp member 7 locked substantially flat against the base portion 12 with an almost perfect step in the strap 4. The flange 20 further presses end 22 into a second step against the top of flange 13 and frictionally holds the strap in this position. Thus actually a double step as well as a reverse bend is ultimately formed in the strap.

It is apparent that various changes may be made in the foregoing specific embodiment without departing from the invention, that embodiment being shown for purposes of illustration.

What is claimed as new and is desired to be secured by Letters Patent is:

1. A clamping device comprising a strap, an L-shaped bracket having a slot in its base parallel to its back, a tensioning screw passing through a threaded aperture in the back, directed across and substantially parallel to its base, a jaw pivotally affixed to the end of the screw extending over the bracket base, and a plate pivotally affixed to the bracket substantially parallel to its base and having a slot therein aligned with the base slot, the screw jaw passing over the plate upon tightening the screw, the strap at one end being affixed to the jaw and passing through the slots, and at its free end, passing through the slot in the bracket and then between the bracket and plate, the jaw forcing the plate against the strap on the extension of the screw across the bracket, to hold the strap between the plate and bracket base.

2. A clamping device comprising a strap, a J-shaped bracket having a transverse slot in its base, a tensioning screw passing through a threaded aperture in its long leg directed across its base toward the short leg of the bracket, a jaw pivotally affixed to the end of the screw between the bracket legs, and a plate pivotally affixed to the bracket adjacent the long leg and lying parallel to the bracket base between the bracket legs, and having a slot therein aligned with that in the bracket, the strap being affixed at one end to the jaw and passing through said slots, and then between the bracket and plate, the jaw forcing the plate against the strap on the extension of the screw across the bracket, the plate bending the strap against the short leg of the bracket, to hold the strap end in the bracket firmly.

3. A clamping device as claimed in claim 2 in which the base of the J bracket is plane and the plate at its free end lies adjacent the short leg of the bracket, whereby pressure on the plate exerted by the jaw bends the strap to substantially a right angle.

4. A clamping device as claimed in claim 2 in which the plate has a second slot therein, parallel to the slot through which the strap passes, said second slot being adjacent and receiving therethrough the long leg of the bracket to hinge the plate to the bracket.

5. A clamping device as claimed in claim 2 in which the short leg of the bracket has an upstanding tip, adjacent the free edge of the plate, and forms a jaw opposed to the jaw on the screw to clamp the strap between the two jaws and to give a further bend to the strap between said tip and plate edge, upon the further extension of the screw.

6. A clamping device as claimed in claim 2 in which the base of the bracket lies in a plane and the screw extends parallel to that plane.

JOHN W. SCHUKRAFT.

REFERENCES CITED

The following references are of record in the file of this patent:

UNITED STATES PATENTS

| Number | Name | Date |
|---|---|---|
| 1,412,188 | Lopdell | Apr. 11, 1922 |